(12) United States Patent
Banerjee et al.

(10) Patent No.: US 11,293,394 B2
(45) Date of Patent: Apr. 5, 2022

(54) STARTER MOTOR SYSTEM FOR A VEHICLE

(71) Applicant: Transportation IP Holdings, LLP, Norwalk, CT (US)

(72) Inventors: Sagar Banerjee, Bangalore (IN); Rajeev R. Verma, Bangalore (IN)

(73) Assignee: Transportation IP Holdings, LLP, Norwalk, CT (US)

( * ) Notice: Subject to any disclaimer, the term of this patent is extended or adjusted under 35 U.S.C. 154(b) by 501 days.

(21) Appl. No.: 16/249,781

(22) Filed: Jan. 16, 2019

(65) Prior Publication Data
US 2020/0224627 A1  Jul. 16, 2020

(51) Int. Cl.
| | |
|---|---|
| *F02N 11/08* | (2006.01) |
| *B61C 7/04* | (2006.01) |
| *B61L 3/00* | (2006.01) |
| *F02N 11/00* | (2006.01) |

(52) U.S. Cl.
CPC ........... *F02N 11/0851* (2013.01); *B61C 7/04* (2013.01); *B61L 3/006* (2013.01); *F02N 11/006* (2013.01); *F02N 11/087* (2013.01); *F02N 2011/0874* (2013.01); *F02N 2300/2011* (2013.01); *F02N 2300/30* (2013.01)

(58) Field of Classification Search
CPC .. F02N 11/0851; F02N 11/087; F02N 11/006; F02N 2300/30; F02N 2011/0874; F02N 2300/2011; F02N 15/04; F02N 11/08; B61L 3/006; B61C 7/04; B61C 5/00; Y02T 30/00

See application file for complete search history.

(56) References Cited

U.S. PATENT DOCUMENTS

| | | | |
|---|---|---|---|
| 7,687,928 B2 | 3/2010 | Taneja et al. | |
| 8,776,753 B2 | 7/2014 | Bradfield et al. | |
| 9,133,810 B2 | 9/2015 | Kees et al. | |
| 2012/0086219 A1* | 4/2012 | Wanner | F02N 15/10 290/38 C |
| 2013/0167790 A1* | 7/2013 | Bradfield | F02N 11/006 123/179.25 |

* cited by examiner

*Primary Examiner* — Hal Kaplan
*Assistant Examiner* — Thai H Tran
(74) *Attorney, Agent, or Firm* — McCoy Russell LLP (57) ABSTRACT

Methods and systems are provided for a starter motor system for cranking an engine. In one example, a starter motor system includes, a battery, two electric motors arranged in series, two main contactors, two auxiliary contactors, and two solenoid contactors. Each of the two electric starter motors may be simultaneously energized to crank the engine in tandem after the pinion gears of both the electric motors are coupled to the ring gear of the engine.

20 Claims, 9 Drawing Sheets

FIG. 5

STARTER MOTOR SYSTEM FOR A VEHICLE

FIELD

Embodiments relate to starter motor systems for engines.

BACKGROUND

Starter motor assemblies are used to start vehicle engines, such as engines in locomotives and in other heavy duty vehicles. A conventional starter motor assembly for a locomotive may broadly include a plurality of electric motors (e.g., two motors) for starting a single engine. The assembly may further include a solenoid and a drive mechanism coupled to each motor. The starter motors are placed in operation when a user closes an ignition switch on the vehicle and energizes the corresponding solenoids. In particular, a pull-in coil of the solenoid is energized. Solenoid energization also moves a pinion of the drive mechanism coupled to each starter motor into engagement with an engine gear ring. Engagement of the motor induces closure of electrical contacts, thereby causing full power to be delivered to the electric motors. The electric motor thereafter delivers torque to the corresponding pinion, which in turn causes the gear ring to rotate, thereby cranking the vehicle engine.

However, it may be difficult for the pinion of each motor of the motor assembly to engage with the engine's gear ring at the same time. For example, there may be a time difference of 0.25 seconds or larger. As a result, there may be a condition where the electrical contact for one motor is closed before the other. This asynchronous energization can cause a higher voltage to be applied on the pull-in coil of one solenoid relative to the other. The overvoltage can damage the pull-in coil windings. This may be particularly of concern in locomotive applications where the battery voltage is higher (e.g., 64V). Further, if the electrical contact for one of the motors gets stuck and fails to engage, the higher voltage appearing across the other motor can lead to motor over-speed.

BRIEF DESCRIPTION OF THE INVENTION

Methods and systems are provided for enabling synchronous energization of starter motors used to crank a locomotive engine. In one embodiment, a locomotive engine starter circuit, comprises: a battery, a first starter motor assembly including a first motor, a first pinion, and a first solenoid with a first pull-in coil and a first hold-in coil, the first pull-in coil arranged in series with the first motor such that current to the first motor is limited when the first pull-in coil is energized, a second starter motor assembly including a second motor, a second pinion, and a second solenoid with a second pull-in coil and a second hold-in coil, the second pull-in coil arranged in series with the second motor such that current to the second motor is limited when the second pull-in coil is energized; the second starter motor assembly arranged in series with the first starter motor assembly, a first main contactor and a second main contactor electrically coupling the battery in series to the first motor and the second motor, respectively, a first auxiliary contactor and a second auxiliary contactor electrically coupling the battery in series to the first pull-in coil and the second pull-in coil, respectively, the first auxiliary contactor arranged parallel to the first main contactor, the second auxiliary contactor arranged parallel to the second main contactor; and a first solenoid contactor and a second solenoid contactor arranged in series to one another and in parallel to the first and the second starter motor assemblies.

In one embodiment, a starter system for a locomotive engine includes two starter motors that are coupled to a high voltage battery in an electrical starter circuit via respective main contactors. Each motor may include a pinion that is mechanically meshable to an engine gear ring upon energization of a pull-in (PI) coil, thereby engaging the motor to the engine. The motor is then held engaged via energization of a hold-in (HI) coil of the starter circuit. Closing of an auxiliary contactor control switch, manually or via a controller with instructions stored therein, results in energization of an auxiliary contactor coil for each motor, which closes the corresponding contactor, and enables energization of the PI and HI coils of the corresponding motor. The energization results in the pinion of the motor engaging with the gear ring of the engine. Engagement of the motor results in closure of a solenoid contactor coupled to the motor. However, due to the series arrangement of the solenoid contactors, battery voltage may be simultaneously directed to both the motors only when both the motors are engaged and both the solenoid contactors are closed. In other words, if one motor is engaged before the other, resulting in the corresponding solenoid contactor being closed, the electrical circuit coupling both the motors to the battery voltage remains open. In this manner, battery voltage can be delivered to both the motors simultaneously. By enabling the motors to be energized by closing the circuit only after both motors are engaged, the possibility of directing the high voltage of the battery to the PI coil of only one of the motors is averted, even if the motors are energized asynchronously. Consequently, burning out of a PI coil due to overvoltage application, and over-speeding of one of the motors of the starter motors system is averted. This improves locomotive engine start performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF FIGURES

The present invention will be better understood from reading the following description of non-limiting embodiments, with reference to the attached drawings, wherein below.

DETAILED DESCRIPTION

Figure 1:
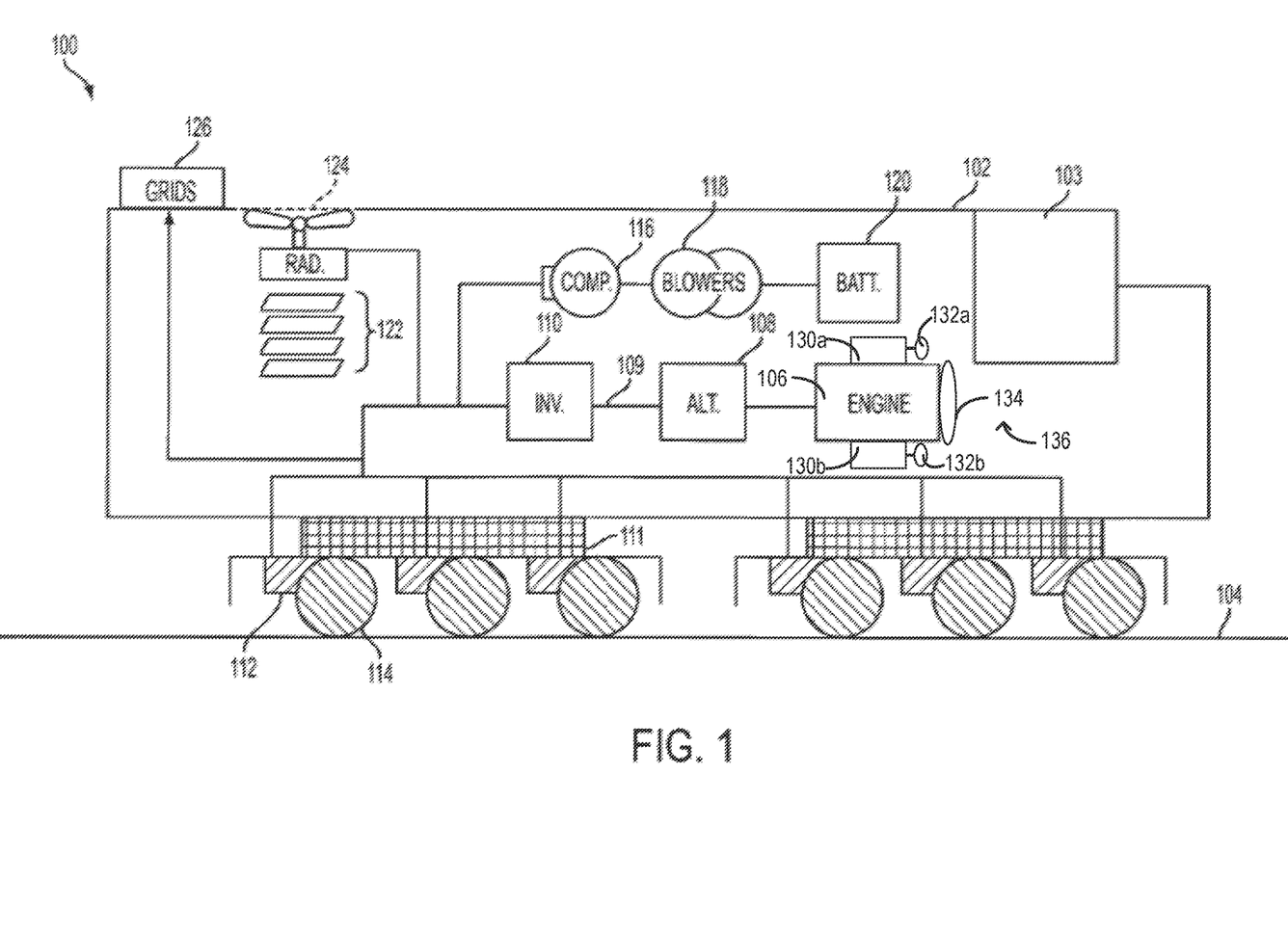
FIG. 1 shows an example embodiment of a diesel-electric locomotive.

FIG. 1 is a block diagram of an example locomotive vehicle system 100 (hereafter referred to as "locomotive 100"), configured to run on track 104. As depicted herein, in one example, the locomotive is a diesel electric vehicle operating a diesel engine 106 located within a main engine housing 102. However, in alternate embodiments of locomotive 100, alternate engine configurations may be employed, such as a gasoline engine or a bio diesel or natural gas engine, for example. Locomotive operating crew and electronic components involved in locomotive systems control and management may be housed within a locomotive cab 103.

The diesel engine generates a torque that is transmitted to an alternator 108 along a drive shaft (not shown). The generated torque is used by alternator 108 to generate electricity for subsequent propagation of the vehicle. Locomotive engine 106 may be run at a constant speed, thereby generating a constant horsepower (hp) output. It will be appreciated that the locomotive engine may also be run at variable speed and variable horse power, depending on operational demand. For example, in one embodiment, engine 106 may be configured to generate up to 4400 hp output. The electrical power generated in this manner may be referred to as the prime mover power. The electrical power may be transmitted along an electrical bus 109 to a variety of downstream electrical components. Based on the nature of the generated electrical output, the electrical bus may be a direct current (DC) bus (as depicted) or an alternating current (AC) bus. Auxiliary alternators generating smaller amounts of power (auxiliary power) for auxiliary components such as air conditioning, heating, etc., may be optionally provided in alternate embodiments of locomotive 100. The auxiliary power may be transmitted along an auxiliary bus. Alternatively, a common electrical bus may be used for the prime mover power and the auxiliary power.

Alternator 108 may be connected in series to one or more rectifiers that convert the alternator's electrical output to DC electrical power prior to transmission along the DC bus 109. Based on the configuration of a downstream electrical component receiving power from the DC bus, an inverter may be used to convert the DC electrical power to AC electrical power. A single inverter 110 may supply AC electrical power from the DC electrical bus to a plurality of components. Alternatively, each of a plurality of distinct inverters may supply electrical power to a distinct component. It will be appreciated that in alternative embodiments, the locomotive may include one or more inverters connected to a switch that may be controlled to selectively provide electrical power to different components connected to the switch.

A traction motor 112, mounted on a truck 111 below the main engine housing 102, may receive electrical power from alternator 108 via DC bus 109 to provide tractive power to propel the locomotive. As described herein, traction motor 112 may be an AC motor. Accordingly, an inverter paired with the traction motor may convert the DC input to an appropriate AC input, such as a three-phase AC input, for subsequent use by the traction motor. In alternate embodiments, traction motor 112 may be a DC motor directly employing the output of the alternator after rectification and transmission along the DC bus. One example locomotive configuration includes one inverter/traction motor pair per wheel axle 114. As depicted herein, six inverter-traction motor pairs are shown for each of six axle-wheel pairs of the locomotive. In alternate embodiments, locomotive 100 may be configured with four inverter/traction motor pairs, for example.

Traction motor 112 may also be configured to act as a generator providing dynamic braking to brake locomotive 100. In particular, during dynamic braking, the traction motor may provide torque in a direction that is opposite from the rolling direction thereby generating electricity that is dissipated as heat by a grid of resistors 126 connected to the electrical bus. In one example, the grid includes stacks of resistive elements connected in series directly to the electrical bus. The stacks of resistive elements may be positioned proximate to the ceiling of main engine housing 102 in order to facilitate air cooling and heat dissipation from the grid.

Air brakes (not shown) making use of compressed air may be used by locomotive 100 as part of a vehicle braking system. The compressed air may be generated from intake air by compressor 116.

A multitude of electric machine driven airflow devices may be operated for temperature control of locomotive components. The airflow devices may include, but are not limited to, blowers, radiators, and fans. Each airflow device may be coupled to an electric machine such as a motor, which, when enabled, may convert a received electrical input into a rotational motion of the airflow device, thereby generating an active flow of air through the airflow device. Depicted herein, blowers 118 may be provided for the forced-air cooling of a number of electrical components. The blowers 118 may include a traction motor blower that blows cool air over traction motor 112 during periods of heavy work in order to regulate traction motor temperature, an alternator blower to blow air to cool alternator 108, and a grid blower to blow air to cool the grid of resistors 126.

The engine temperature is maintained in part by a radiator 124. Water may be circulated around engine 106 to absorb excess heat and contain the temperature within a desired range for efficient engine operation. The heated water may then be passed through radiator 124 wherein air blown through the radiator fan cools the heated water. The flow of air through the radiator fan may be further adjusted with the help of louvers 122, vents (not shown), air ducts (not shown), or a combination thereof. The radiator fan may be located in a horizontal configuration proximate to the rear ceiling of locomotive 100 such that upon blade rotation, air may be sucked from below and exhausted. The radiator fan motor may be configured to receive electrical power from the DC bus 109 by way of a dedicated inverter. A cooling system comprising a water-based coolant may optionally be used in conjunction with the radiator 124 to provide additional cooling of the engine.

A system electrical energy storage device 120, depicted as a battery in this example (and also referred to as "system battery 120"), may also be linked to DC bus 109. A DC-DC converter (not shown) may be configured between DC bus 109 and battery 120 to allow the high voltage of the DC bus (for example in the range of 1000V) to be stepped down appropriately for use by the battery (for example in the range of 12-75V). In the case of a hybrid locomotive, the on-board electrical energy storage device may be in the form of high voltage batteries, such that the placement of an intermediate DC-DC converter may not be necessitated. The battery may be charged by running engine 106. The electrical energy stored in the battery may be used during a stand-by mode of engine operation, or when the engine is shutdown, to operate various electronic components such as lights, on-board monitoring systems, microprocessors, processor displays, climate controls, and the like. Battery 120 may also be used to provide an initial charge to start-up engine 106 from a shutdown condition. In alternate embodiments, the electrical energy storage device 120 may be a super-capacitor, for example.

Engine 106 may be started via a starter motor assembly 136 comprising a plurality of starter motors. In the depicted example, two starter motors 130a, 130b are provided, in series. Each of the starter motors 130a, 130b, has a corresponding pinion gear 132a, 132b which can be meshed with engine ring gear 134 so as to engage the motors. As elaborated with reference to FIGS. 2 and 3A-3E, a series of contactor switches may be incorporated into the starter motor assembly 136 so as to ensure that the motors are powered only after they have been engaged to the engine. This mitigates damage to any of the pinion gears from overvoltage application resulting from asynchronous energizing of the motors.

Figure 2:
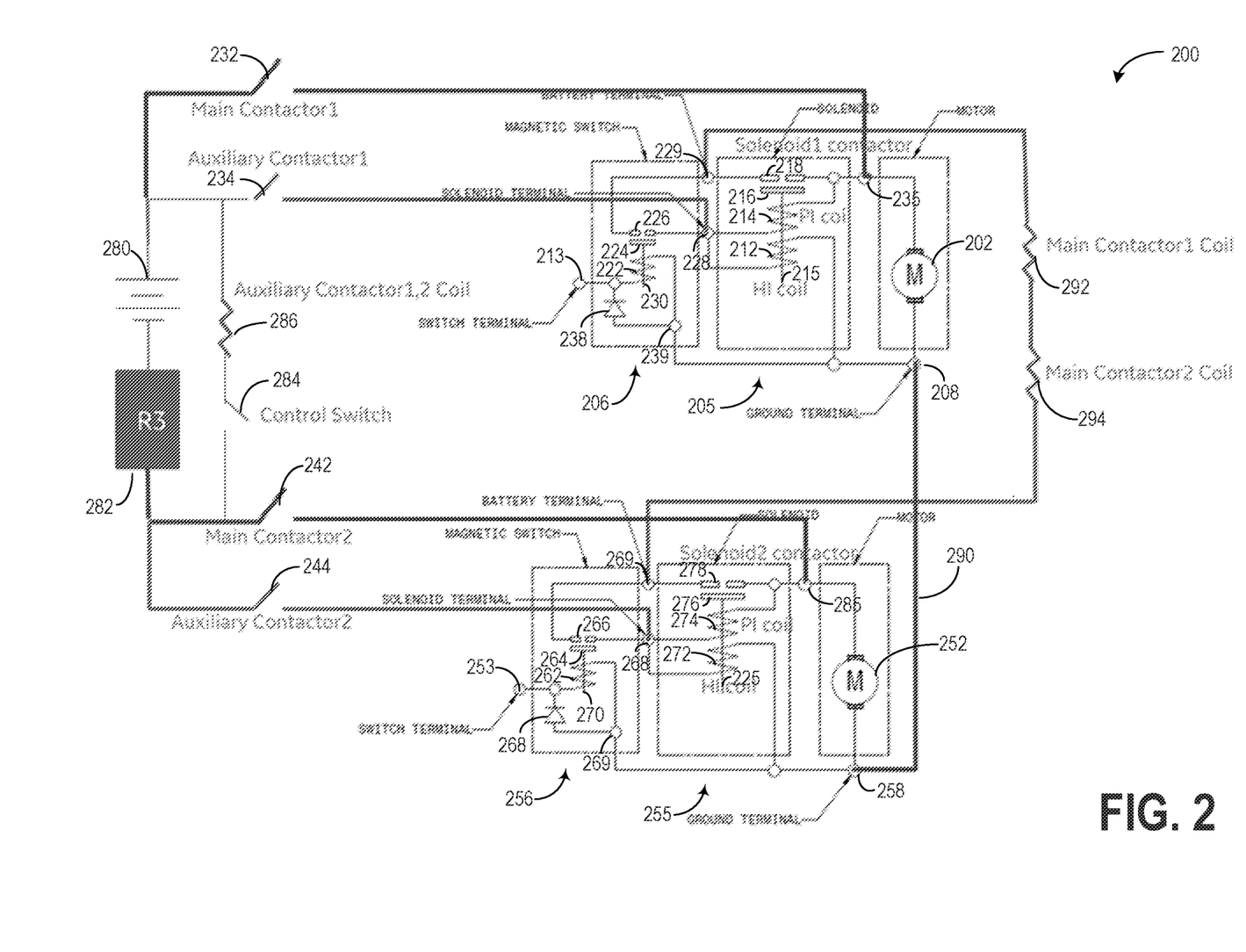
FIG. 2 shows an example map of the electrical architecture of a starter motor system for cranking an engine of the locomotive.

FIG. 2 shows an example schematic of an electrical architecture of a starter motor system 200 for cranking an engine of a locomotive. The starter motor system 200 includes a vehicle battery or battery pack 280, a first starter motor assembly 205, a second starter motor assembly 255, a jumper cable 290, a first magnetic switch 206, and a second magnetic switch 256. The first starter motor assembly 205 and the second starter motor assembly 255 may be the starter motors 130a, 130b in FIG. 1. The battery 280 may be a 64 V battery including a positive terminal and a negative terminal.

The first motor assembly 205 includes a first battery terminal 229, a first solenoid terminal 228, and a first ground terminal 208. The second motor assembly 255 includes a second battery terminal 269, a second solenoid terminal 268, and a second ground terminal 258. The positive terminal battery 280 may be coupled to each of the first solenoid terminal 228 of the first motor assembly 205 via a first auxiliary contractor 234, and a motor terminal 235 of the first motor assembly 205 via a first main contactor 232. The negative terminal of the battery 280 may be coupled in series to a resistor 282. The resistor 282 may be coupled to each of the second solenoid terminal 268 of the second motor assembly 255 via a second auxiliary contractor 244, and a second motor terminal 285 of the second motor assembly 255 via a second main contactor 242. The first battery terminal 229 of the first motor assembly 205 may be coupled to the second battery terminal 269 of the second motor assembly 255 via each of a first main contactor coil 292 and a second main contactor coil 294.

The jumper cable 290 may connect a first ground terminal 208 of the first motor assembly 205 to a second ground terminal 258 of the second motor assembly 255. In this way, the jumper cable 290 may couple the first motor assembly 205 to the second motor assembly 255 in a series connection. The jumper cable 290 may comprise a copper wire or any conductor offering relatively lower losses.

The first motor assembly 205 may include a first electric motor 202 while the second motor assembly 255 may include a second electric motor 252. The two electric motors 202 and 253 may be coupled in series via the resistor 282. In this example, each of the two electric motors 202 and 253 may be a 24V motor. By using the resistor 282, two 24V motors may be connected in series with the 64V battery without the requirement of additional converters. In another example, each of the two electric motors 202 and 253 may be 32V motors and each of the motors may be directly coupled to the 64V battery 280 without the resistor 282. In yet another example, a separate DC-DC converter may be used to step down 64V from the battery to 48V and then apply the 48V voltage across the two 24V motors in series (without the requirement of the resistor 282).

The first starter motor assembly 205 includes a pull-in (PI) coil 214, a hold-in (HI) coil 212, and a solenoid contactor comprising stationary contacts 218 and a plunger contact 216 provided on a plunger 215. The PI coil 214, the HI coil 212, and contacts 218, 216 are commonly found on solenoid assemblies for starter motor and may be provided in a plurality of embodiments.

The first battery terminal 229 of the first starter motor assembly 205 may be coupled to a first of the two stationary contacts 218. The first solenoid terminal 228 leads to a node of both the PI coil 214 and the HI coil 212, and to an end of the HI coil 212 distal from the PI coil 214. The first ground terminal 208 may be coupled to the first electric motor 202 and to the jumper cable 290.

The second starter motor assembly 255 generally includes the same internal components and terminals as the first starter motor assembly 205. The second starter motor assembly 255 includes a pull-in (PI) coil 217, a hold-in (HI) coil 272, and a solenoid contactor comprising stationary contacts 278 and a plunger contact 276 provided on a plunger 225.

The second battery terminal 269 of the second starter motor assembly 255 may be coupled to a first of the two stationary contacts 278. The second solenoid terminal 268 leads to a node of both the PI coil 274 and the HI coil 272, and to an end of the HI coil 272 distal from the PI coil 274. The second ground terminal 258 may be coupled to the second electric motor 252 and to the jumper cable 290.

During initiation of engine cranking by the starter motors, the pinion gears of each of the two starter motors may concurrently mesh with the ring gear of the engine. However, in one scenario, the pinion gear of any one electric motor may mesh with the engine ring gear prior to the engagement of the other electric motor. In other words, there may be delay between the engagements of the two motors with the engine. This may lead to a higher voltage to flow across the PI coil of the starter motor that has been engaged first (as resistance of PI coil is much greater than the motor resistances). In a system with 64V battery, the higher voltage flowing through the PI coil may cause degradation of the PI coil. In order to address this concern, the first battery terminal 229 may be coupled to the second battery terminal 269 via an additional pair of contactors, namely first main contactor coil 292 and second main contactor coil 244. The first main contactor coil 292 and the second main contactor coil 294 may be closed to simultaneously bypass the PI coils of both starter motor assemblies. The first main contactor coil 242 and the second main contactor coil 244 may be energized only upon confirmation that both the motors have engaged into the gear ring of the engine. In this way, by using an additional pair of contactors to bypass the PI coils of both starter motors, the possibility of directing the high voltage of the 64V battery 280 to the PI coil of only one of the motors is averted. Also, windings of the PI coils used in the duel motor assembly may not have to be modified to account for a scenario where an increased amount of current may flow through the coils.

The battery 280 may have a mid-point ground and not negative or positive grounds. Therefore, the electric motors may be connected in reverse such as in the order of armature winding (AA) of first electric motor 202—field winding (FF) of first electric motor 202—motor ground to frame (GND) first electric motor 202—GND of second electric motor 252—FF of second electric motor 252—AA of second electric motor 252. This connection sequence results in a mid-point ground for the motors which keeps the circuit in balance. In this way, the motor frame grounds may be kept separate from the battery 280. Since the direction of current in the AA and FF for each individual motor remains same, the torque generated in each motor would be in the same direction.

The first magnetic switch 206 is coupled to the first starter motor assembly 205, the first magnetic switch 206 includes a solenoid assembly comprising a coil 262, a plunger 230, plunger contact 224, stationary contacts 226, and a diode 238. The first magnetic switch 206 also include four terminals including a battery terminal, a solenoid terminal, a switch terminal 213, and a ground terminal 239. The solenoid terminal of the first magnetic switch 206 may be coupled to the first solenoid terminal 228 while the battery terminal of the first magnetic switch 206 may be coupled to the first battery terminal 229. In one example, the control switch 284 may be controlled by the operator of the vehicle. Upon closing the control switch 284, the auxiliary contactor 1,2 coil 286 may get energized which initiates the mechanism of energizing the electric motors 202 and 252 during engine cranking. FIGS. 3A-3E show an example sequence of events that may occur in an electrical circuit of the starter motor system 200 during engine cranking.

The second magnetic switch 256 may include the same internal components and terminals as the first magnetic switch 206. The second magnetic switch 256 is coupled to the second starter motor assembly 255, the second magnetic switch 256 including a solenoid assembly including a coil 262, a plunger 270, plunger contact 264, stationary contacts 266, and a diode 268. The second magnetic switch 256 also include four terminals including a battery terminal, a solenoid terminal, a switch terminal 253, and a ground terminal 269. The solenoid terminal of the second magnetic switch 256 may be coupled to the second solenoid terminal 268 while the battery terminal of the second magnetic switch 256 may be coupled to the second battery terminal 269. By using the auxiliary contactors 234 and 244, the magnetic switches may be bypassed and the switch terminals 213 and 253 may not be connected to the control switch 284 in the vehicle. Operation of the dual starter motor arrangement is described in details in FIGS. 3A-3E and FIG. 4.

Figure 3A:
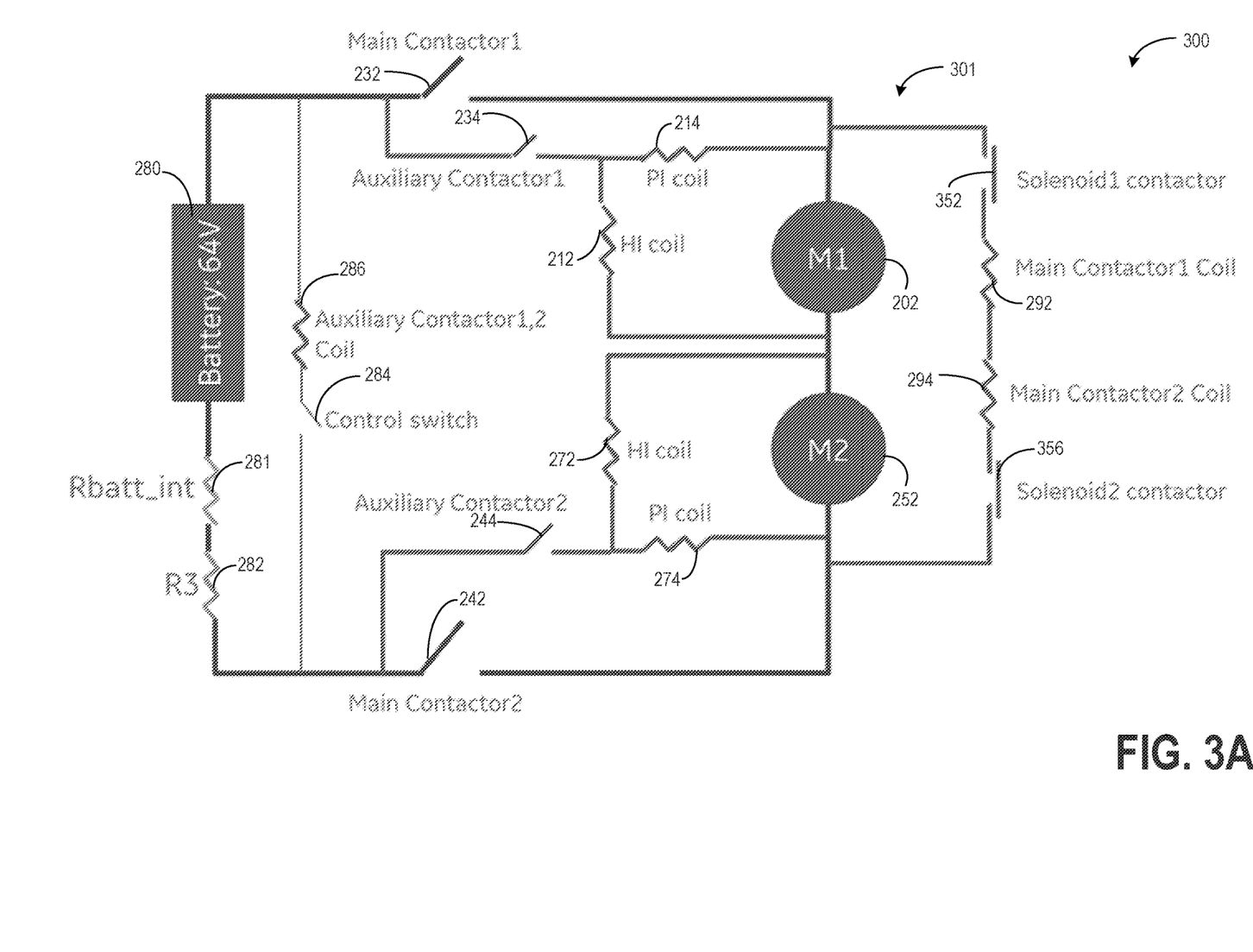
FIGS. 3A-3E show an example sequence of contactor switch positions that may be implemented for an electrical circuit of the starter motor system during engine cranking.

FIGS. 3A-3E show a sequence of steps enabling cranking of an engine of a locomotive using a starter motor system comprising two starter motors in series. FIG. 3A shows a first state 300 of the electrical architecture of a starter motor system 301 for cranking the engine of the locomotive. The starter motor system 301 may be the starter motor system 200 in FIG. 2. The components described in FIG. 2 are numbered similarly and not re-introduced. In this circuit, the internal resistance of the battery is depicted as Rbatt_int 281 which is in series with the resistor 282.

When the engine is not being cranked by the starter motor system 301, all contactors of the starter motor system 301 electrical circuit may be held open. This includes maintaining each of the control switch 284, the auxiliary contactors 234, 244, main contactors 232 242, and solenoid contactors 352, 358 for each of the two starter motors open. While in this configuration, current may not flow through either of the electric motors 202 and 252. The pinion gears of the electric motors 202 and 252 may not be engaged with the ring gear of the engine.

Figure 3B:
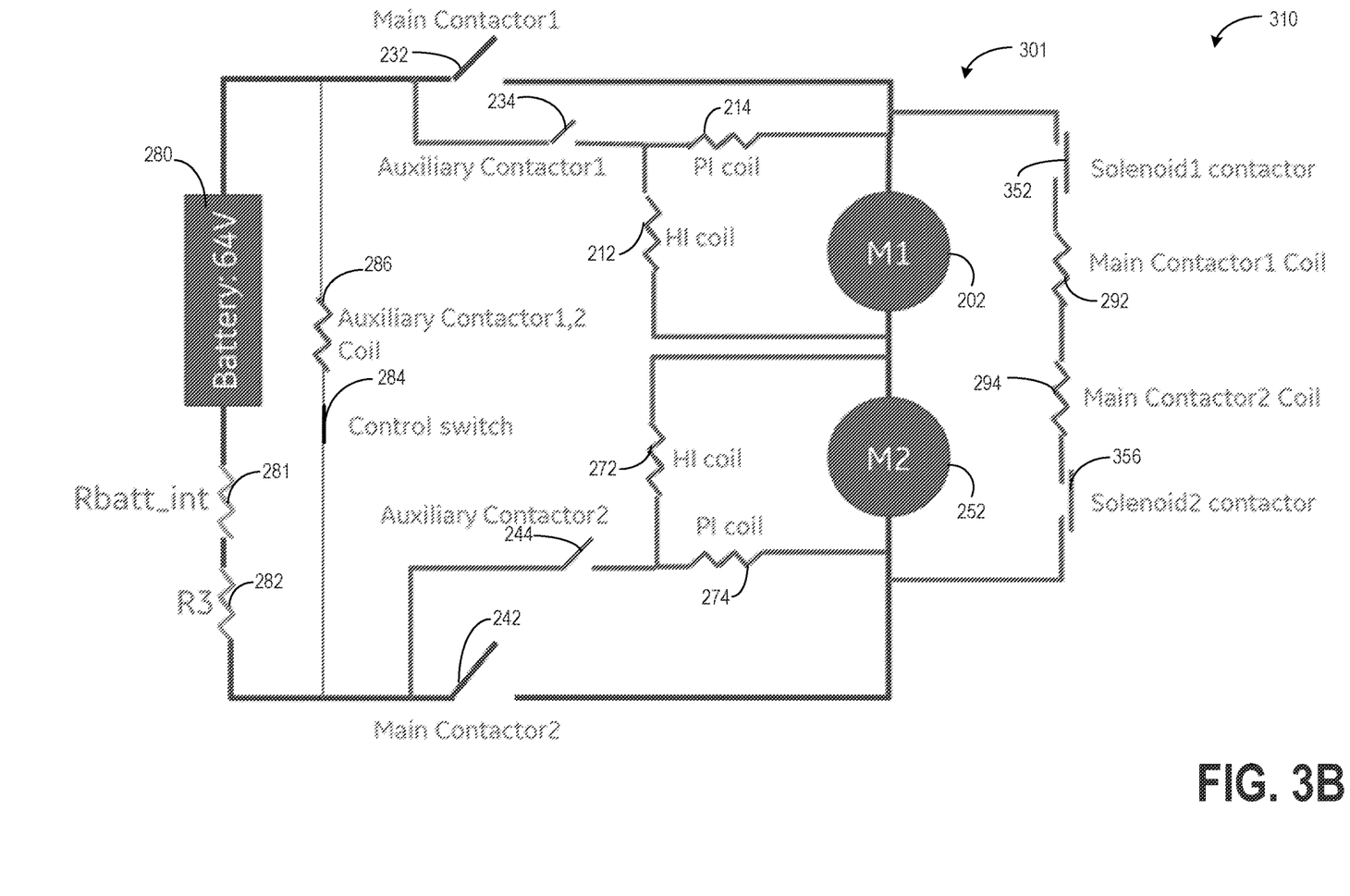

FIG. 3B shows a second state 310 of the electrical architecture of a starter motor system 301 for cranking the engine. The second state may be initiated from the first state upon confirmation that a request for engine cranking via the starter motor system has been received. In one example, a request for engine cranking in a locomotive engine may be made by the operator when an ignition switch is closed such as by insertion of a key or by actuation of a button.

In one example, the control switch 284 may be closed manually. In another example, the control switch may be closed electronically. The controller of the locomotive engine system may send a signal to the actuator coupled to the control switch 284 to close the switch. Once the control switch 284 is closed, the circuit connecting the auxiliary coil 286 with the 64V battery 280 may be complete. As current flows through the auxiliary coil 286, the auxiliary contactor coil 286 may be energized.

Figure 3C:
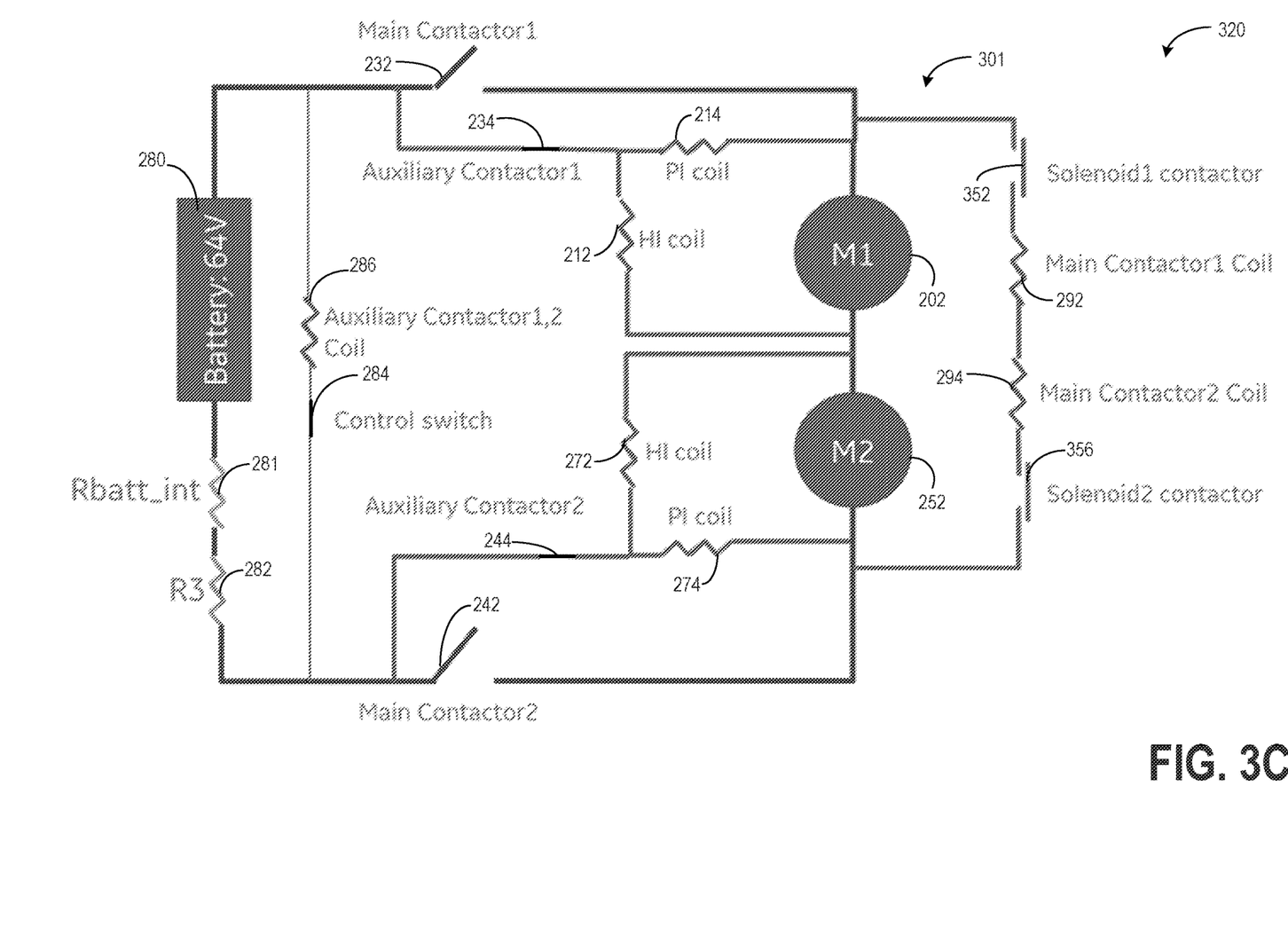

FIG. 3C shows a third state 320 of the electrical architecture of a starter motor system 301 for cranking the engine. Upon energizing of the auxiliary coil 286, each of the first auxiliary contactor 234 and the second auxiliary contactor 244 may be closed. Once the first auxiliary contactor 234 is closed, electric current may flow through the first solenoid terminal 228. The current may flow through each of the first PI coil 214 and the first HI coil 212. Similarly, once the second auxiliary contactor 244 is closed, electric current may flow through the second solenoid terminal 268 and the current may flow through each of the second PI coil 274 and the second HI coil 272. In alternate embodiments, the first auxiliary contactor 234 and the second auxiliary contactor 244 may be configured as magnetic switches or relays.

Current flowing through the PI coils 214 and 274 may also be directed to the electric motors 202 and 252 as soft start current. The amplitude of this soft start current may be inversely proportional to the resistances of the PI coils 214 and 274, thereby limiting the torque applied on the pinion gears of the electric motors 202 and 252. At this point, operation of the electric motors 202 and 252 may be independent of one another.

Current flowing through the PI coils 214 and 274 creates a magnetic field that causes plungers (such as plungers 215 and 225 in FIG. 2) to move towards their respective stationary contacts (such as stationary contacts 218 and 278 in FIG. 2) and engage the stationary contacts. Upon engaging the stationary contacts, the pinion gears of each electric motor 202 and 252 may be engaged (meshed) with the ring gear of the engine. The rotational torque applied on the pinion gears of the electric motor (from the soft start current) may facilitate in engaging the pinion gears with the ring gear of the engine flywheel. Once the pinion gears of the two motors are engaged with the ring gear, the current flowing through the HI coils may hold the respective engagements in place.

Figure 3D:
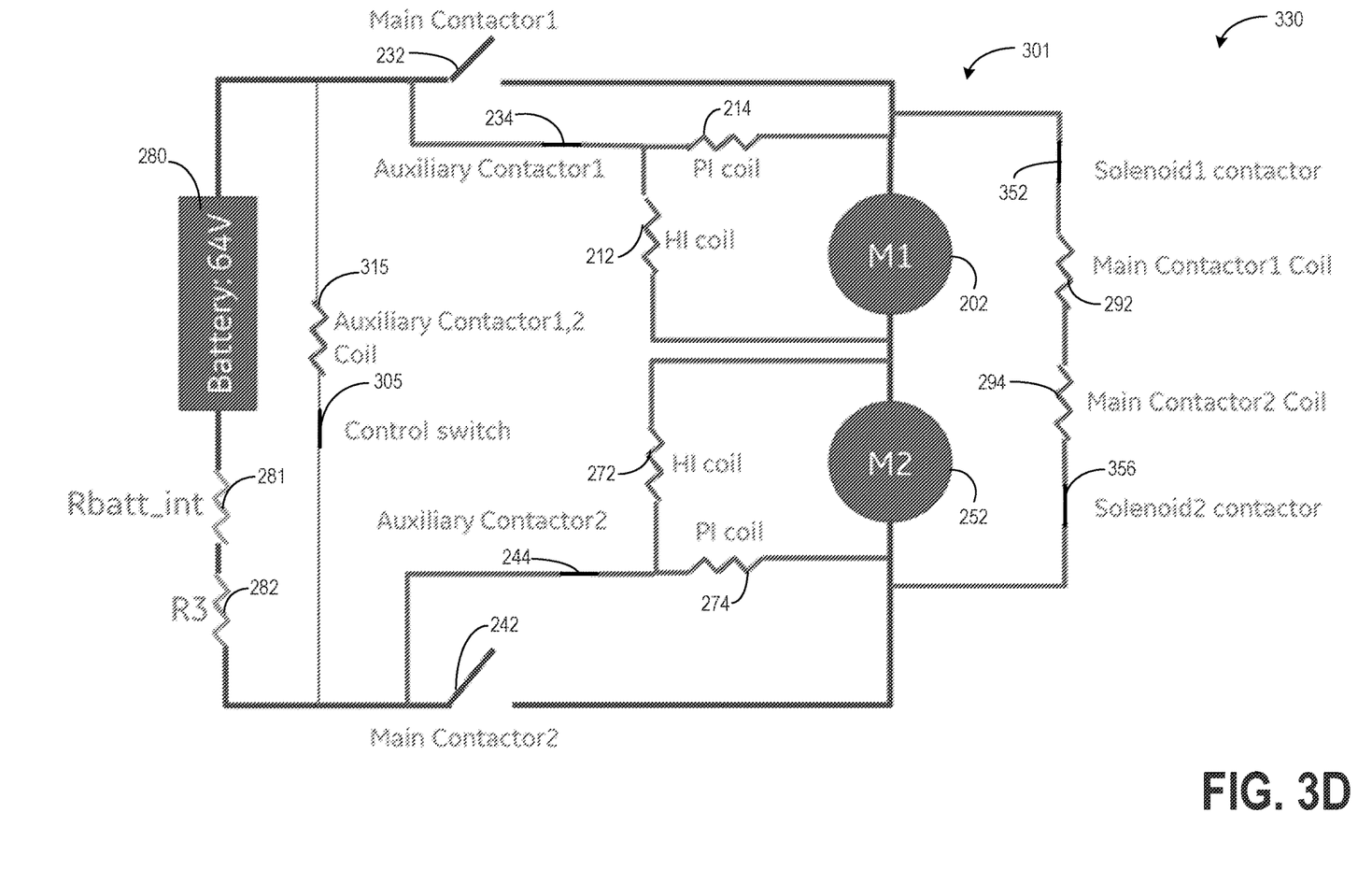

FIG. 3D shows a fourth state 330 of the electrical architecture of a starter motor system 301 for cranking the engine. After engagement of the pinions gears of both the electric motors 202 and 252 with the engine ring gear, a first solenoid contactor 352 and a second solenoid contactor 356 may be closed. In one example, the first solenoid contactor 352 and the second solenoid contactor 356 may close simultaneously. In another example, due to structural differences in the mechanical components of the solenoids and the plungers, one solenoid contactor may close before the other solenoid contactor. Once both the solenoid contactors 352 and 356 are closed, the circuit for the first main contactor coil 292 and the second main contactor coil 294 is complete.

Figure 3E:
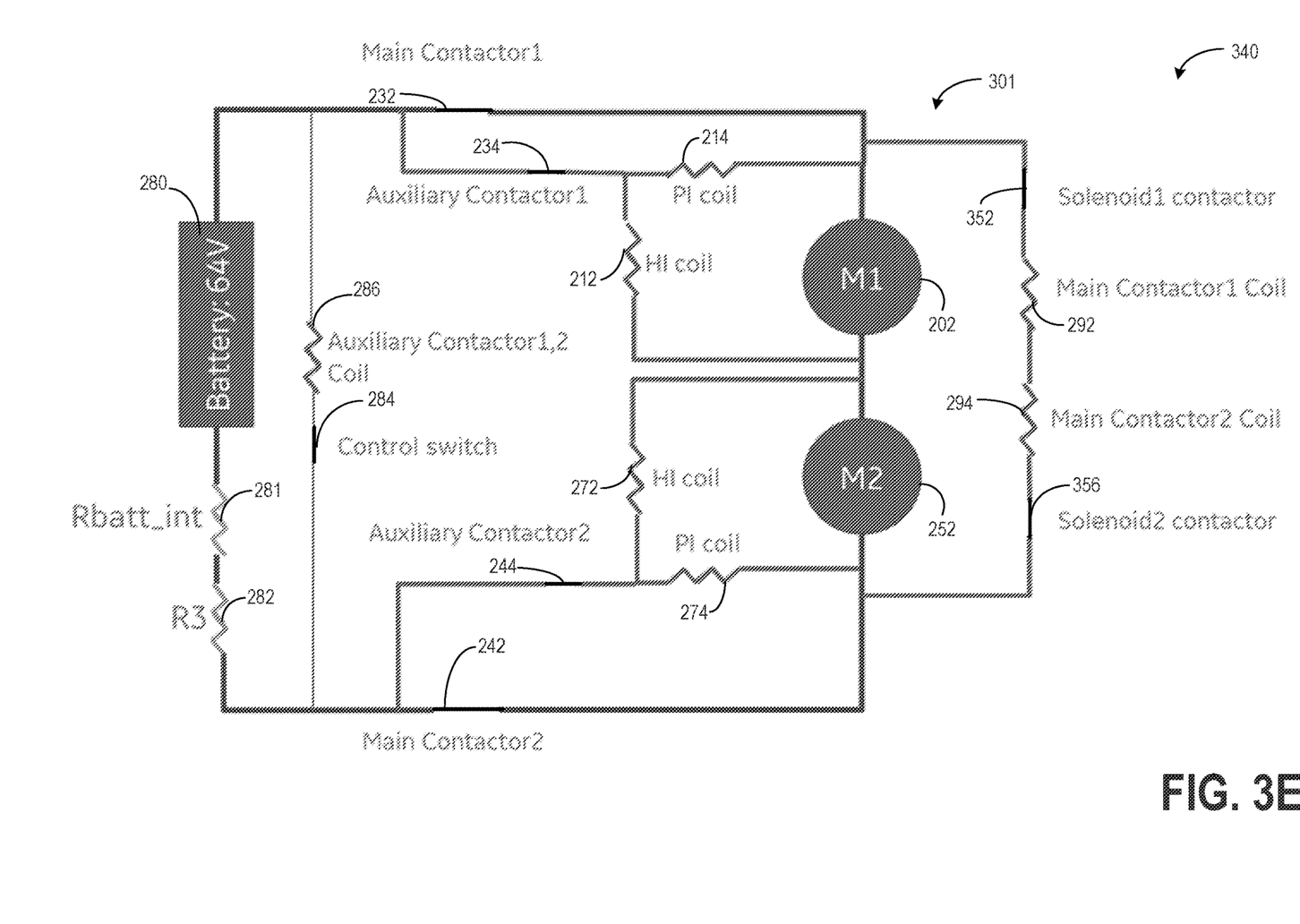

FIG. 3E shows a fourth state 340 of the electrical architecture of a starter motor system 301 for cranking the engine. As the circuit for the first main contactor coil 292 and the second main contactor coil 294 is completed, the first main contactor coil 292 and the second main contactor coil 294 may be energized. Due to energizing of the main contractor coils, the first main contactor 232 and the second main contactor 292 may close, thereby completing the electric circuit and powering both the electric motors 202 and 252 simultaneously.

By adding an additional pair of contactors (the main contactors 232 and 242), degradation of one or both of the PI coils 214, 274 due to excess current flow through a PI coil may be averted. As an example, during engagement of pinion gears of the electric motors to the ring gear of the engine, if one electric motor (say the first motor 202) engages before the other electric motor (say the second motor 252), the first solenoid contactor 352 for the first motor 202 may close prior to closing of the second solenoid contactor 356. Since resistance of a PI coil is greater than the resistance of an electric motor, closing of the first solenoid contactor 353 may cause a majority of the 64V battery voltage to appear across the first PI coil 214, thereby damaging the PI coil windings. However, in this circuit, the main contactors may bypass the PI coils, thereby protecting the PI coils from higher voltage. By closing the main contactors only after both the motors have engaged with the engine, full battery voltage may be simultaneously applied across both the motors.

In this way, the components of FIGS. 1-2 enable a starter system, comprising: a locomotive engine including a gear ring, a battery, and a starter circuit comprising: a first and a second starter motor arranged in series to each other and the battery along a main loop of the starter circuit via a first auxiliary contactor and a second auxiliary contactor; a first pull-in coil coupled in series between the first motor and the battery via the first auxiliary contactor, and a second pull-in coil coupled in series between the second motor and the battery via the second auxiliary contactor, and, a first and a second solenoid switch coupled in series to one another and to the first and second motor along an outer loop, parallel to the main loop.

Figure 4:
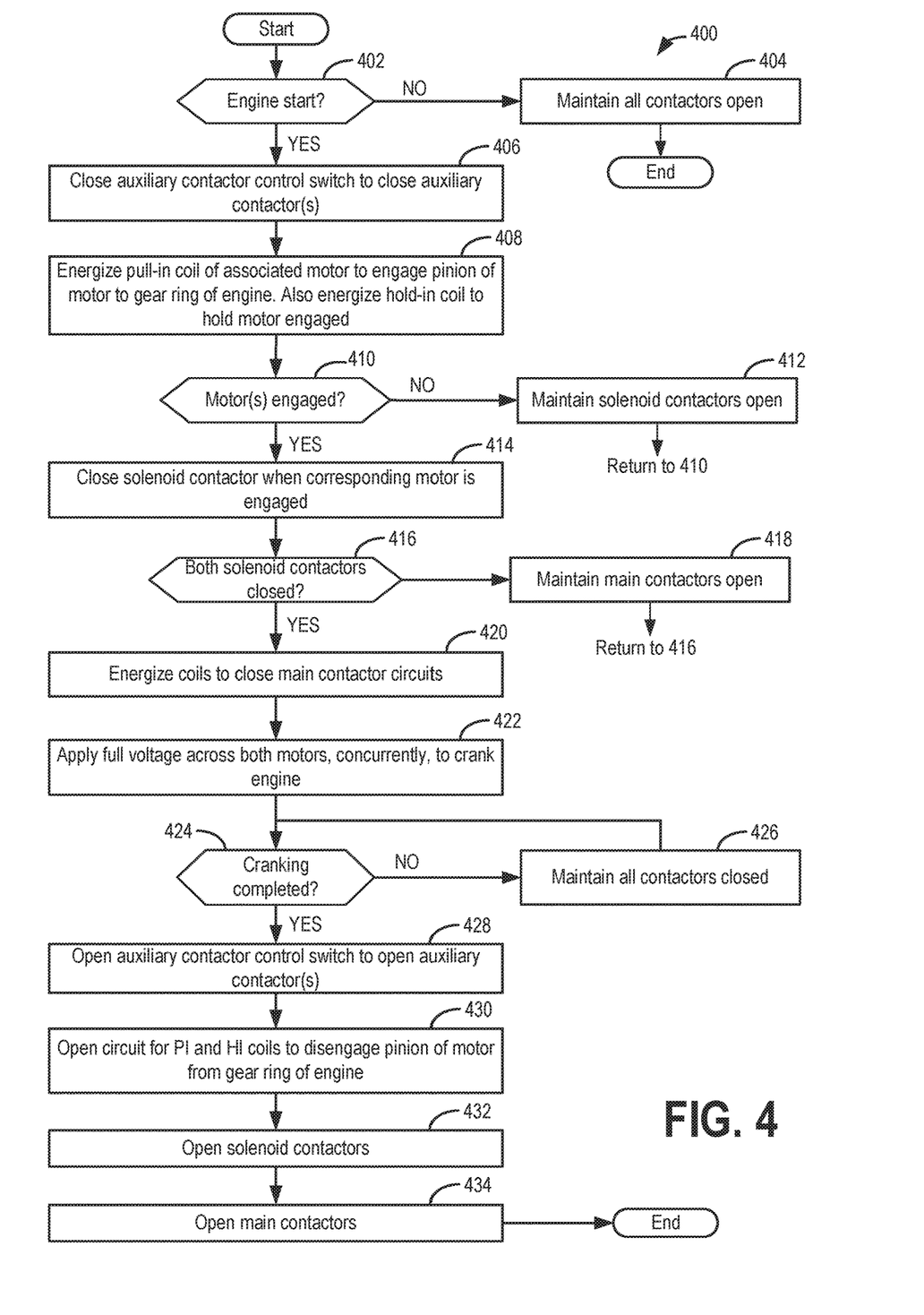
FIG. 4 shows a high level flow chart for starting a locomotive engine with a starter motor assembly via a series of contactors, according to the present disclosure.

Turning now to FIG. 4, an example method 400 is described for operating a starter motor electrical circuit to enable cranking of a locomotive engine. Instructions for carrying out method 400 may be executed by a controller based on instructions stored on a memory of the controller and in conjunction with signals received from sensors of the vehicle system. The controller may employ actuators of the vehicle system, such as the electrical contactors of the electrical circuit of FIGS. 2-3E to adjust engine operation, according to the methods described below. It will be appreciated that while the method of FIG. 4 is described with reference to an electrical circuit for two starter motors cranking a given locomotive engine, the same approach may be similarly extended for an engine start system having more than two starter motors for cranking a locomotive engine.

At 402, the method includes confirming an engine start condition. In one example, an engine start is confirmed responsive to a locomotive operator requesting an engine start via insertion of an ignition key, actuation of a start button, or change in position of a locomotive throttle control. If an engine start is not confirmed, then at 404, all contactors of an engine start electrical circuit may be held open. This includes maintaining each of the auxiliary contactors, main contactors, and solenoid contactors for each of the two starter motors open.

If an engine start condition is confirmed, then at 406, the method includes closing an auxiliary contactor control switch of an engine starter system's electrical circuit. In one example, the control switch may be closed manually. In another example, the control switch may be closed electronically, via command signals sent to an actuator from a vehicle engine controller. The auxiliary contactor switch may electrically couple the first auxiliary contactor and the second auxiliary contactor to each other and closing the auxiliary contactor switch may selectively energize each of the first and second auxiliary contactor closed. Closure of the auxiliary contactor control switch electrically couples an auxiliary contactor coil to a starter system battery. Passage of electrical energy from the battery through the auxiliary contactor coil causes the coil to be energized. Energization of the auxiliary contactor coil, in turn, automatically closes a first auxiliary contactor coupled to a first electric motor of the starter system, and a second auxiliary contactor coupled to a second electric motor of the starter system. In other words, energization of a single coil (the auxiliary contactor coil) results in closure of both the auxiliary contactors).

Closure of the first auxiliary contactor electrically couples a first pull-in coil and a first hold-in coil of the first motor to the starter system battery. Similarly, closure of the second auxiliary contactor electrically couples a second pull-in coil and a second hold-in coil of the second motor to the starter motor system battery. At 408, passage of electrical energy from the battery through each of the first pull-in coil, the second pull-in coil, the first hold-in coil, the second hold-in coil causes each of the coils to be energized.

Electrical energy flowing through the two PI coils may create magnetic fields that may cause plungers coupled to each of the two PI coils to move towards their respective stationary contacts and engage the stationary contacts. In this way, energization of the first pull-in coil may move the first pinion in an axial direction towards an engine ring gear, and wherein the energization of the second pull-in coil moves the second pinion in the axial direction towards the engine ring gear. Once the stationary contacts are engaged, the pinion gear of each of the two motors may be engaged with the ring gear coupled to the engine flywheel.

Current flowing through each of the first PI coil and the second PI coil may also be directed to the electric motors as soft start current. This soft current creates a rotational torque which facilitate in engaging the pinion gears to the engine ring gear. Once the pinion gears of a motor are engaged with the ring gear of the engine, the current flowing through the HI coil of the motor may hold the engagement in place. In this way, both the HI coils may maintain the engagements of the two motors with the engine flywheel.

At 410, it is determined if the motors have been engaged. In one example, the motors may engage simultaneously. In another example, the motors may engage asynchronously due to delays incurred in engagement of the motor's pinion with the engine's gear ring. While a motor is disengaged, or partially engaged, at 412, a solenoid contactor coupled to that motor remains open. At 414, engagement of the motor with the engine results in the corresponding solenoid contactor to close.

At 416, it is determined if both of a first solenoid contactor coupled to the first motor and a second solenoid contactor coupled to the second motor have been closed. In one example, the solenoid contactors may close simultaneously. In another example, the solenoid contactors may close asynchronously due to differences between the individual motors, solenoid coils, and the mechanical plungers coupled to the solenoid coils of the circuit. Due to the specific coupling of the solenoid contactors in series, until both solenoid contactors are closed, neither of the solenoid contactors are electrically coupled to the starter system battery. Therefore, at 418, until both solenoid contactors are closed, the circuit for the corresponding main contactors, coupling the motors to the system battery, remains open and neither of the motors are powered.

At 420, once both solenoid contactors are closed, the circuit for a first main contactor coil coupling the first motor to the system battery and a second main contactor coil coupling the second motor to the system battery are closed, completing the circuit, and enabling the corresponding main contactor coils to be energized. Simultaneous energization of the coils results in the simultaneous closure of the corresponding main contactors. The first and second solenoid contactors when closed, are electrically coupled to the first and second main contactors in series. At this time, all contactors of the electrical circuit are closed, including the main, solenoid, and auxiliary contactors for both motors. At 422, due to the main contactors closing at the same time, both the first and the second motor are powered at the same time. Both the motors are then able to operate in tandem to crank the engine.

In this way, by using an additional set of contactors, flow of excess current through a single PI coil prior to engagement of both motors may be averted, thereby reducing the possibility of PI coil damage. Also, since the motors are energized upon confirmation that both the motors have been engaged, over speeding of a single motor caused by excess current flow through the motor may be avoided. If there is a time difference between engagement of the two motors and the motor that is first engaged is powered prior to powering the second motor, an undesirable sound may result from the engine being cranked by a single motor while the other motor is being meshed with the engine ring gear. By simultaneously powering the two motors, the undesired noise caused by cranking of the engine by a single motor may be averted. This improves overall locomotive engine start performance.

At 424, it is determined if cranking of the engine is complete. For example, it may be determined if the engine speed is above a threshold speed, such as above 400rpm, or above an idling speed. If the engine speed is not above the threshold speed, then at 426, all the contactors are maintained closed. Once the engine speed is above the threshold speed, and cranking is completed, the engine may resume receiving fuel and spark, and engine rotation may thereafter be maintained using torque generated via cylinder combustion. At this time, the starter motors may be decoupled from the engine such that the motor may not over speed due to engine speed ramp up.

Decoupling the motors from the battery after cranking the engine includes, at 428, opening the auxiliary contactor control switch of the engine starter system's electrical circuit. In one example, the engine controller may send a signal to the actuator of the control switch to open the switch. Opening of the auxiliary contactor control switch electrically decouples an auxiliary contactor coil from the starter system battery, thereby de-energizing the auxiliary contactor coil. De-energization of the auxiliary contactor coil, in turn, may automatically open each of the first auxiliary contactor coupled to the first electric motor of the starter system, and the second auxiliary contactor coupled to the second electric motor of the starter system.

Opening of the first auxiliary contactor electrically decouples the first pull-in coil and the first hold-in coil of the first motor from the starter system battery. Similarly, opening of the second auxiliary contactor electrically decouples the second PI coil and the second HI coil of the second motor from the starter system battery. At 430, opening of the circuits for the PI coils and the HI coils stop the flow of electric current from the battery through each of the first PI coil, the second PI coil, the first HI coil, the second HI coil causing each of the coils to be de-energized. De-energizing of the PI coils and the HI coils cause the plungers to disengage from the stationary contacts, thereby disengaging the pinion gears of each of the two motors from the ring gear of the engine.

At 432, disengagement of the motors with the engine results in the corresponding solenoid contactors to open. At 434, once both the solenoid contactors are open, the circuit for the first main contactor coil coupling the first motor to the system battery and the second main contactor coil coupling the second motor to the system battery may open. Once the circuit breaks, the corresponding main contactor coils may be de-energized. De-energization of the coils results in the simultaneous opening of the corresponding main contactors. At this time, all contactors of the electrical circuit are open, including the main, solenoid, and auxiliary contactors for both motors. Therefore, the circuit for the motors is open and power may no longer be delivered to any of the starter motors.

In this way, current may be circulated, simultaneously, from a battery through each of a first starter motor and a second starter motor to crank an engine, the simultaneous current flow delayed until each of a pair of serially arranged solenoid switches are closed, the pair of solenoid switches arranged in parallel to a starter circuit including the battery and the first and second starter motors.

Figure 5:
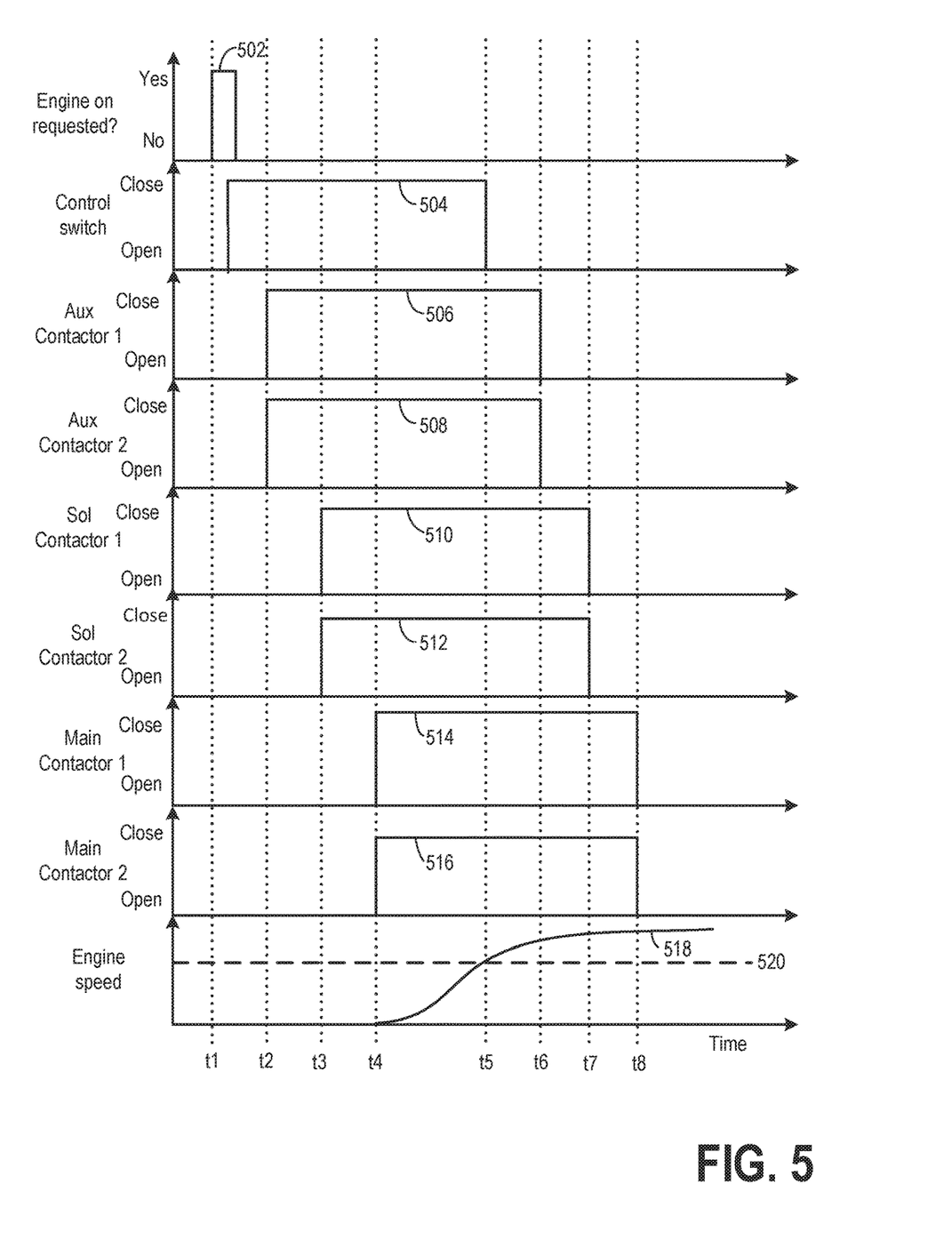
FIG. 5 shows an example timeline of starting a locomotive engine using a starter motor assembly.

FIG. 5 shows an example timeline 500 illustrating operation of a starter motor system (such as starter motor system 301 in FIGS. 3A-3E) during cranking of a locomotive engine. Starter motor system may include two electric motors and an electrical assembly for simultaneously operating the two motors during cranking of the locomotive engine. The horizontal (x-axis) denotes time and the vertical markers t1-t8 identify significant times in the routine for operation of the starter motor system.

The first plot, line 502, shows a request for starting a locomotive engine. The second plot, line 504, shows a position of an auxiliary contactor control switch (such as control switch 284 in FIGS. 3A-3E) of an auxiliary contactor coil. The third plot, line 506, shows a position of a first auxiliary contactor (such as first auxiliary contactor 234 in FIGS. 3A-3E) coupled to a first electric motor of the starter system. The fourth plot, line 508, shows a position of a second auxiliary contactor (such as second auxiliary contactor 244 in FIGS. 3A-3E) coupled to a second electric motor of the starter system. The fifth plot, line 508, shows a position of a first solenoid contactor (such as first solenoid contactor 252 in FIGS. 3A-3E). The sixth plot, line 510, shows a position of a second solenoid contactor (such as second solenoid contactor 256 in FIGS. 3A-3E). The seventh plot, line 512, shows a position of a first main contactor (such as first main contactor 242 in FIGS. 3A-3E). The eighth plot, line 514, shows a position of a first solenoid contactor (such as second main contactor 244 in FIGS. 3A-3E). The ninth plot, line 516, shows a speed of the locomotive engine as estimated via a crankshaft position sensor. Dashed line 520 denotes a threshold engine speed above which the engine is no longer cranked. The threshold engine speed is the engine idling speed.

Prior to time t1, the engine is at rest with each switch in the starter motor assembly in their respective open positions. At time t1, a locomotive operator requests an engine start via insertion of an ignition key. In response to the engine start request, the controller initiates operation of the starter motor system. The activation of the starter motor system is described in steps 406 to 422 of method 400 with reference to FIG. 4. The control switch is closed to connect an auxiliary contactor coil to a starter system battery.

At time t2, upon energization of the auxiliary contactor coil, the first auxiliary contactor and the second auxiliary are closed. Closing of the auxiliary contactors results in engagement of the pinion gears of each of the electric motors to a ring gear of the engine. Once the electric motors are engaged with the engine ring gear, at time t3, the first solenoid contactor and the second solenoid contactor are closed.

Closure of the two solenoid contactors result in simultaneous energization of the main coils in the electrical circuit. At time t4, upon confirmation that the main coils are energized, the first main contactor and the second main contactor are closed, thereby coupling the two electric motors with the system battery. Therefore, at time t4, all contactors of the electrical circuit are closed, including the main, solenoid, and auxiliary contactors for both motors. Due to the simultaneous closure of the main contactors, both the electric motors are powered at the same time. Between time t4 and t5, both the motors are able to operate in tandem to crank the engine.

As the engine is cranked by the starter motor system, the engine speed gradually increases. At time t5, the engine speed increases to above the threshold speed 520 and engine cranking is no longer desired. Hence deactivation of the starter motor system is initiated at time t5. The deactivation of the starter motor system is described in steps 428 to 434 of method 400 with reference to FIG. 4. The control switch is opened to disconnect the auxiliary contactor coil from the starter system battery.

At time t6, due to de-energization of the auxiliary contactor coil, the first auxiliary contactor and the second auxiliary open. Opening of the auxiliary contactors results in decoupling of the pinion gears of each of the electric motors from the ring gear of the engine. Once the electric motors are disengaged from the engine, at time t7, the first solenoid contactor and the second solenoid contactor open.

Upon opening of the solenoid contactors, the circuit for the first main contactor coil coupling the first motor to the system battery and the second main contactor coil coupling the second motor to the system battery breaks, thereby causing the main contactor coils to be de-energized. At time t8, de-energization of the coils results in the simultaneous opening of the first main contractor and the second main contractor. In this way, at this time t8, all contactors of the electrical circuit are open, including the main, solenoid, and auxiliary contactors for both motors and power is no longer be delivered to any of the starter motors. After time t8, the starter motor system is maintained inactive while the engine is operated by combustion.

In this way, by including additional contactors in a starter motor circuit, a relay can be provided that better ensures that power is delivered to both starter motors simultaneously. By arranging the additional contactors in a series arrangement, issues associated with asynchronous engagement of the starter motors are averted. In particular, even if the pinion of a motor engages with the engine at a different time from the pinion of the other motor of the starter system, due to the series arrangement, power delivery to either motor is disabled until both motors have engaged. As a result, overpowering and over-speeding of any given starter motor is averted. By reducing power over-delivery, burning out of the PI coils is reduced, extending the lift and improving the performance of the starter motor system.

An example starter locomotive engine starter circuit, comprises: a battery, a first starter motor assembly including a first motor, a first pinion, and a first solenoid with a first pull-in coil and a first hold-in coil, the first pull-in coil arranged in series with the first motor such that current to the first motor is limited when the first pull-in coil is energized, a second starter motor assembly including a second motor, a second pinion, and a second solenoid with a second pull-in coil and a second hold-in coil, the second pull-in coil arranged in series with the second motor such that current to the second motor is limited when the second pull-in coil is energized; the second starter motor assembly arranged in series with the first starter motor assembly, a first main contactor and a second main contactor electrically coupling the battery in series to the first motor and the second motor, respectively, a first auxiliary contactor and a second auxiliary contactor electrically coupling the battery in series to the first pull-in coil and the second pull-in coil, respectively, the first auxiliary contactor arranged parallel to the first main contactor, the second auxiliary contactor arranged parallel to the second main contactor, and a first solenoid contactor and a second solenoid contactor arranged in series to one another and in parallel to the first and the second starter motor assemblies. In any or all of the preceding examples, the circuit further comprising, additionally or optionally, an auxiliary contactor switch electrically coupling the first auxiliary contactor and the second auxiliary contactor to each other. In any or all of the preceding examples, additionally or optionally, closing the auxiliary contactor switch selectively energizes each of the first and second auxiliary contactor closed. In any or all of the preceding examples, additionally or optionally, closing of the first auxiliary contactor selectively energizes the first pull-in coil and the first hold-in coil due to current flow there-through, and wherein closing of the second auxiliary contactor selectively energizes the second pull-in coil and the second hold-in coil due to current flow there-through. In any or all of the preceding examples, additionally or optionally, the energization of the first pull-in coil moves the first pinion in an axial direction towards an engine ring gear, and wherein the energization of the second pull-in coil moves the second pinion in the axial direction towards the engine ring gear. In any or all of the preceding examples, additionally or optionally, the energization of the first pull-in coil engages the first pinion of the first motor with an engine ring gear, and wherein the energization of the second pull-in coil engages the second pinion of the second motor with the engine ring gear, the first pinion and the second pinion held engaged with the engine ring gear via energization of the first and second hold-in coils, respectively. In any or all of the preceding examples, additionally or optionally, the first solenoid contactor closes responsive to mechanical engagement of the first pinion, and the second solenoid contactor closes responsive to selectively engagement of the second pinion, a timing of engagement of the first pinion asynchronous with the timing of engagement of the second pinion. In any or all of the preceding examples, additionally or optionally, the first and the second main contactors are magnetically closed responsive to closing of each of the first and second solenoid contactors, and wherein closing of the first and second main contactors causes current to flow from the battery through the first motor and the second motor, without flowing through the first and second pull-in coils. In any or all of the preceding examples, the circuit further comprising, additionally or optionally, a locomotive engine, wherein the engine is cranked via each of the first motor and the second motor when current flows through the first motor and the second motor. In any or all of the preceding examples, additionally or optionally, the battery is a 64V battery, and wherein each of the first and second starter motors are 24V motors connected in series with a resistor.

Another example locomotive system comprises: an engine, a starter circuit comprising a battery and first and second starter motors, a pair of serially arranged solenoid switches, the pair of solenoid switches arranged in parallel to the starter circuit, and a controller configured with computer readable instructions that when executed cause the controller to: responsive to an engine start request, delay a simultaneous current flow from the battery through each of the first and second starter motor until each of the pair of solenoid switches is closed, and initiate engine cranking responsive to the simultaneous current flow. In any preceding example, additionally or optionally, the first and starter motor are arranged in series to each other and the battery along a main loop of the starter circuit via a first auxiliary contactor and a second auxiliary contactor, and wherein the starter circuit further includes a first pull-in coil coupled in series between the first motor and the battery via the first auxiliary contactor, a second pull-in coil coupled in series between the second motor and the battery via the second auxiliary contactor, and a first and second solenoid switch coupled in series to one another and to the first and second motors along an outer loop of the starter circuit, parallel to the main loop. In any or all of the preceding examples, additionally or optionally, responsive to the start request, the controller actuates close an auxiliary control switch coupled to the main loop to flow current from the battery to the first auxiliary and second auxiliary contactor, wherein flow of current through the first contactor closes a first of the pair of serially arranged solenoid switches, and flow of current through the second contactor closes a remaining of the pair of serially arranged solenoid switches, and wherein the pair of solenoid switches close asynchronously. In any or all of the preceding examples, additionally or optionally, the current flow through each of the first and the second auxiliary contactors flows thereon through the first and second pull-in coils, pulling a first pinion of the first motor and a second pinion of the second motor into mechanical engagement with the gear ring of the engine. In any or all of the preceding examples, additionally or optionally, the first and the second solenoid switches are closed asynchronously as the first and the second pinions engage with the engine, wherein initiating engine cranking responsive to the simultaneous current flow includes flowing current through each of the first and second motors while bypassing the first and second pull-in coil only after each of the pair of solenoid switches are closed.

In yet another example, a method for starting a locomotive engine comprises: flowing current, simultaneously, from a battery through each of a first starter motor and a second starter motor to crank an engine, the simultaneous current flow delayed until each of a pair of serially arranged solenoid switches are closed, the pair of solenoid switches arranged in parallel to a starter circuit including the battery and the first and second starter motors. In any preceding example, additionally or optionally, the pair of solenoid switches includes a first solenoid switch closed responsive to engagement of the first motor with the engine, and a second solenoid switch closed responsive to engagement of the second motor with the engine, engagement of the first motor asynchronous with the engagement of the second motor. In any or all of the preceding examples, additionally or optionally, a first pull-in coil is coupled in series to the first motor and a second pull-in coil is arranged in series to the second motor, wherein engagement of the first motor includes flowing current through the first pull-in coil and engagement of the second motor includes flowing current through the second pull-in coil, and wherein flowing current simultaneously, from a battery through each of a first and second starter motor to crank the engine includes flowing current through the first and second motor while bypassing the first and second pull-in coil. In any or all of the preceding examples, additionally or optionally, the battery is a 64V battery.

Each of the electric motors described herein may include components like stators, rotors, bearings, output shafts, and electrical terminals. For example, a motor may include a stationary stator, a rotor inside the stator that is configured to rotate relative to the stator (e.g., as supported by bearings), an output shaft attached to the rotor, and one or more electrical terminals depending on the type of motor (e.g., DC or AC). The motor components (e.g., rotor and stator) are magnetically and/or electro-magnetically configured to that when designated electric power waveforms are applied to the terminals of the motor, the rotor rotates for causing the output shaft to rotate to drive a load. Some motors may be configured to operate in 'reverse' as generators, such that when the shaft is mechanically driven, electrical power is produced by the motor and output through the terminals.

In a further representation, an example starter system comprises: a locomotive engine including a gear ring, a battery, and a starter circuit comprising: a first and a second starter motor arranged in series to each other and the battery along a main loop of the starter circuit via a first auxiliary contactor and a second auxiliary contactor, a first pull-in coil coupled in series between the first motor and the battery via the first auxiliary contactor, and a second pull-in coil coupled in series between the second motor and the battery via the second auxiliary contactor, and a first and a second solenoid switch coupled in series to one another and to the first and second motor along an outer loop, parallel to the main loop. In any preceding example, the system further comprising, additionally or optionally, an auxiliary control switch coupled to the main loop for selectively controlling a flow of current from the battery to the first auxiliary contactor and the second auxiliary contactor. In any or all of the preceding examples, the system further comprising, additionally or optionally, a controller configured with computer readable instructions stored on non-transitory memory that when executed cause the controller to actuate the control switch closed responsive to an engine start request, the closing of the control switch enabling current to flow through and close each of the first and the second auxiliary contactors. In any or all of the preceding examples, additionally or optionally, current flowing through each of the first and the second auxiliary contactors flows thereon through the first and second pull-in coil, pulling a first pinion of the first motor and a second pinion of the second motor into mechanical engagement with the gear ring of the engine. In any or all of the preceding examples, additionally or optionally, the first and the second solenoid switch are moved to a closed position as the first and the second pinion engage with the engine, current flowing through each of the first and the second solenoid switch only after both the first and the second pinion are fully engaged with the engine, current further flowing through each of the first and second motors only after both the first and the second solenoid switches are closed.

This written description uses examples to disclose the invention, and to enable one of ordinary skill in the relevant art to practice embodiments of the invention, including making and using the devices or systems and performing the methods. The patentable scope of the invention is defined by the claims, and may include other examples that occur to one of ordinary skill in the relevant art. Such other examples are intended to be within the scope of the claims if they have structural elements that do not differ from the literal language of the claims, or if they include equivalent structural elements with insubstantial differences from the language of the claims.

The invention claimed is:

1. An engine starter circuit, comprising:
   a battery;
   a first starter motor assembly including a first motor, a first pinion, and a first solenoid with a first pull-in coil and a first hold-in coil, the first pull-in coil arranged in series with the first motor such that current to the first motor is limited when the first pull-in coil is energized;
   a second starter motor assembly including a second motor, a second pinion, and a second solenoid with a second pull-in coil and a second hold-in coil, the second pull-in coil arranged in series with the second motor such that current to the second motor is limited when the second pull-in coil is energized; the second starter motor assembly arranged in series with the first starter motor assembly;
   a first main contactor and a second main contactor electrically coupling the battery in series to the first motor and the second motor, respectively;
   a first auxiliary contactor and a second auxiliary contactor electrically coupling the battery in series to the first pull-in coil and the second pull-in coil, respectively, the first auxiliary contactor arranged parallel to the first main contactor, the second auxiliary contactor arranged parallel to the second main contactor; and
   a first solenoid contactor and a second solenoid contactor arranged in series to one another and in parallel to the first and the second starter motor assemblies, wherein the first and second solenoid contactors when closed, are electrically coupled to the first and second main contactors in series.

2. The circuit of claim 1, further comprising an auxiliary contactor switch electrically coupling the first auxiliary contactor and the second auxiliary contactor to each other.

3. The circuit of claim 2, wherein closing the auxiliary contactor switch energizes each of the first and second auxiliary contactors closed.

4. The circuit of claim 1, wherein closing of the first auxiliary contactor energizes the first pull-in coil and the first hold-in coil due to current flow there-through, and wherein closing of the second auxiliary contactor energizes the second pull-in coil and the second hold-in coil due to current flow there-through.

5. The circuit of claim 4, wherein the energization of the first pull-in coil moves the first pinion in an axial direction towards an engine ring gear, and wherein the energization of the second pull-in coil moves the second pinion in the axial direction towards the engine ring gear.

6. The circuit of claim 4, wherein the energization of the first pull-in coil engages the first pinion of the first motor with an engine ring gear, and wherein the energization of the second pull-in coil engages the second pinion of the second motor with the engine ring gear, the first pinion and the second pinion held engaged with the engine ring gear via energization of the first and second hold-in coils, respectively.

7. The circuit of claim 6, wherein the first solenoid contactor closes responsive to mechanical engagement of the first pinion, and the second solenoid contactor closes responsive to selective engagement of the second pinion, a timing of engagement of the first pinion asynchronous with the timing of engagement of the second pinion.

8. The circuit of claim 7, wherein the first and the second main contactors are magnetically closed responsive to closing of each of the first and second solenoid contactors, and wherein closing of the first and second main contactors causes current to flow from the battery through the first motor and the second motor, without flowing through the first and second pull-in coils.

9. The circuit of claim 8, further comprising an engine, wherein the engine is cranked via each of the first motor and the second motor when current flows through the first motor and the second motor.

10. The circuit of claim 1, wherein the battery is a 64V battery, and wherein each of the first and second starter motors are 24V motors connected in series with a resistor.

11. An engine starter circuit, comprising:
    a first starter motor assembly including a first motor and a first solenoid with a first pull-in coil, the first pull-in coil arranged in series with the first motor such that current to the first motor is limited when the first pull-in coil is energized;
    a second starter motor assembly including a second motor and a second solenoid with a second pull-in coil, the second pull-in coil arranged in series with the second motor such that current to the second motor is limited when the second pull-in coil is energized, the second starter motor assembly arranged in series with the first starter motor assembly;
    a first main contactor and a second main contactor electrically coupling a battery in series to the first motor and the second motor, respectively;
    a first auxiliary contactor and a second auxiliary contactor electrically coupling the battery in series to the first pull-in coil and the second pull-in coil, respectively, the first auxiliary contactor arranged parallel to the first main contactor, the second auxiliary contactor arranged parallel to the second main contactor; and
    a first solenoid contactor and a second solenoid contactor arranged in series to one another and in parallel to the first and the second starter motor assemblies, wherein the first and second solenoid contactors when closed, are electrically coupled to the first and second main contactors in series.

12. The circuit of claim 11, further comprising an auxiliary contactor switch electrically coupling the first auxiliary contactor and the second auxiliary contactor to each other.

13. The circuit of claim 12, wherein closing the auxiliary contactor switch energizes each of the first and second auxiliary contactors closed.

14. The circuit of claim 11, wherein closing of the first auxiliary contactor energizes the first pull-in coil due to current flow there-through, and wherein closing of the second auxiliary contactor energizes the second pull-in coil due to current flow there-through.

15. The circuit of claim 14, wherein the energization of the first pull-in coil moves a first pinion in an axial direction towards an engine ring gear, and wherein the energization of the second pull-in coil moves a second pinion in the axial direction towards the engine ring gear.

16. The circuit of claim 14, wherein the energization of the first pull-in coil engages a first pinion of the first motor with an engine ring gear, and wherein the energization of the second pull-in coil engages a second pinion of the second motor with the engine ring gear, the first pinion and the second pinion held engaged with the engine ring gear via energization of a first hold-in coil and a second hold-in coil, respectively.

17. The circuit of claim 16, wherein the first solenoid contactor closes responsive to mechanical engagement of the first pinion, and the second solenoid contactor closes responsive to selective engagement of the second pinion, a timing of engagement of the first pinion asynchronous with the timing of engagement of the second pinion, wherein the first and the second main contactors are closed responsive to closing of each of the first and second solenoid contactors, and wherein closing of the first and second main contactors causes current to flow from the battery through the first motor and the second motor, without flowing through the first and second pull-in coils, and the circuit further comprises an engine, wherein the engine is cranked via each of the first motor and the second motor when current flows through the first motor and the second motor.

18. An engine starter circuit, comprising:
a first starter motor assembly including a first motor and a first solenoid with a first pull-in coil, the first pull-in coil arranged in series with the first motor such that current to the first motor is limited when the first pull-in coil is energized;
a second starter motor assembly including a second motor and a second solenoid with a second pull-in coil, the second pull-in coil arranged in series with the second motor such that current to the second motor is limited when the second pull-in coil is energized, the second starter motor assembly arranged in series with the first starter motor assembly;
a first main contactor and a second main contactor electrically coupling the battery in series to the first motor and the second motor, respectively;
a first auxiliary contactor and a second auxiliary contactor electrically coupling the battery in series to the first pull-in coil and the second pull-in coil, respectively, the first auxiliary contactor arranged parallel to the first main contactor, the second auxiliary contactor arranged parallel to the second main contactor; and
a first solenoid contactor, a first main contactor coil, a second main contactor coil, and a second solenoid contactor arranged in series to one another, and the first solenoid contactor, the first main contactor coil, the second main contactor coil, and the second solenoid contactor arranged in parallel to the first and the second starter motor assemblies.

19. The circuit of claim 18, further comprising an auxiliary contactor switch electrically coupling the first auxiliary contactor and the second auxiliary contactor to each other, wherein closing the auxiliary contactor switch energizes each of the first and second auxiliary contactors closed.

20. The circuit of claim 18, wherein closing of the first auxiliary contactor energizes the first pull-in coil due to current flow there-through, and wherein closing of the second auxiliary contactor energizes the second pull-in coil due to current flow there-through, wherein the energization of the first pull-in coil engages a first pinion of the first motor with an engine ring gear, and wherein the energization of the second pull-in coil engages a second pinion of the second motor with the engine ring gear, the first pinion and the second pinion held engaged with the engine ring gear via energization of a first hold-in coil and a second hold-in coil, respectively, wherein the first solenoid contactor closes responsive to mechanical engagement of the first pinion, and the second solenoid contactor closes responsive to selective engagement of the second pinion, a timing of engagement of the first pinion asynchronous with the timing of engagement of the second pinion, wherein the first and the second main contactors are closed responsive to closing of each of the first and second solenoid contactors, and wherein closing of the first and second main contactors causes current to flow from the battery through the first motor and the second motor, without flowing through the first and second pull-in coils, and the circuit further comprises an engine, wherein the engine is cranked via each of the first motor and the second motor when current flows through the first motor and the second motor.

\* \* \* \* \*